US009002926B2

(12) United States Patent
Nicks et al.

(10) Patent No.: US 9,002,926 B2
(45) Date of Patent: *Apr. 7, 2015

(54) METHODS FOR SUGGESTING DOMAIN NAMES FROM A GEOGRAPHIC LOCATION DATA

(75) Inventors: Paul Nicks, Marion, IA (US); Adam Dicker, Richmond Hill, CA (US); Robert Bacus, Iowa City, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/092,230

(22) Filed: Apr. 22, 2011

(65) Prior Publication Data

US 2012/0271877 A1    Oct. 25, 2012

(51) Int. Cl.
*G06F 15/16* (2006.01)
*H04L 29/06* (2006.01)
*H04L 29/12* (2006.01)

(52) U.S. Cl.
CPC ............ *H04L 67/42* (2013.01); *H04L 61/1511* (2013.01); *H04L 61/3025* (2013.01); *H04L 61/609* (2013.01)

(58) Field of Classification Search
CPC ............ H04L 61/1505; H04L 61/1511; H04L 61/3025
See application file for complete search history.

(56) References Cited

U.S. PATENT DOCUMENTS

| | | | |
|---|---|---|---|
| 6,298,341 B1 | 10/2001 | Mann et al. | |
| 6,332,158 B1 | 12/2001 | Risley et al. | |
| 6,519,589 B2 | 2/2003 | Mann et al. | |
| 6,560,634 B1 * | 5/2003 | Broadhurst | 709/203 |
| 6,687,746 B1 | 2/2004 | Shuster et al. | |
| 6,745,248 B1 | 6/2004 | Gardos et al. | |
| 6,895,430 B1 | 5/2005 | Schneider | |
| 6,901,436 B1 | 5/2005 | Schneider | |
| 7,188,138 B1 | 3/2007 | Schneider | |
| 7,664,831 B2 | 2/2010 | Cartmell et al. | |
| 7,685,311 B2 | 3/2010 | Friedman et al. | |
| 2002/0065903 A1 | 5/2002 | Fellman | |
| 2002/0091703 A1 | 7/2002 | Bayles | |
| 2002/0091827 A1 * | 7/2002 | King et al. | 709/226 |
| 2003/0110293 A1 | 6/2003 | Friedman et al. | |
| 2004/0199493 A1 | 10/2004 | Ruiz et al. | |
| 2004/0199520 A1 * | 10/2004 | Ruiz et al. | 707/100 |
| 2005/0172031 A1 | 8/2005 | Adelman | |
| 2005/0203891 A1 | 9/2005 | Broadhurst et al. | |

(Continued)

OTHER PUBLICATIONS

U.S. Appl. No. 13/092,230, Unpublished.

(Continued)

*Primary Examiner* — Dhairya A Patel
(74) *Attorney, Agent, or Firm* — Karl A. Fazio

(57) ABSTRACT

Systems and methods of the present invention provide for displaying, suggesting and registering available domain names on a client computer based on selected geographical locations from online mapping service software or a geo-location software. Any combination of an online mapping software and a domain name registration software may receive a selection of one or more geographical locations within a displayed geographical area. Alternatively, a location of a client computer may be detected using the geo-location software. One or more available domain names may be parsed for keywords related to the selected geographical area, and one or more available domain names may be suggested based on the selected keywords.

12 Claims, 6 Drawing Sheets

(56) References Cited

U.S. PATENT DOCUMENTS

| | | |
|---|---|---|
| 2005/0216290 A1 | 9/2005 | Sachs et al. |
| 2006/0161682 A1 | 7/2006 | King et al. |
| 2006/0271668 A1 | 11/2006 | Parsons et al. |
| 2007/0061298 A1 | 3/2007 | Wilson et al. |
| 2007/0083652 A1 | 4/2007 | King et al. |
| 2007/0198495 A1* | 8/2007 | Buron et al. ............ 707/3 |
| 2007/0281689 A1 | 12/2007 | Altman et al. |
| 2008/0198162 A1 | 8/2008 | Ni |
| 2008/0294768 A1* | 11/2008 | Sampson et al. ............ 709/224 |
| 2009/0006351 A1* | 1/2009 | Stephenson et al. ............ 707/4 |
| 2009/0125308 A1 | 5/2009 | Ambler |
| 2009/0248625 A1 | 10/2009 | Adelman et al. |
| 2009/0248734 A1 | 10/2009 | Adelman et al. |
| 2009/0248735 A1 | 10/2009 | Adelman et al. |
| 2009/0248736 A1 | 10/2009 | Adelman et al. |
| 2009/0292696 A1 | 11/2009 | Shuster |
| 2011/0282988 A1* | 11/2011 | Wang et al. ............ 709/224 |
| 2012/0023085 A1* | 1/2012 | Bellerive et al. ............ 707/706 |
| 2012/0096019 A1 | 4/2012 | Manickam et al. |
| 2013/0254179 A1* | 9/2013 | Tan ............ 707/706 |

OTHER PUBLICATIONS

U.S. Appl. No. 13/092,244, Unpublished.
U.S. Appl. No. 13/092,254, Unpublished.
Feb. 1, 2013 office action in related U.S. Appl. No. 13/092,244.
Feb. 8, 2013 response to Feb. 1, 2013 office action in related U.S. Appl. No. 13/092,244.
Jan. 31, 2014 office action in related U.S. Appl. No. 13/092,254.
MapQuest Online Mapping Software as seen on Apr. 16, 2009.

* cited by examiner

METHODS FOR SUGGESTING DOMAIN NAMES FROM A GEOGRAPHIC LOCATION DATA

CROSS REFERENCE TO RELATED PATENT APPLICATIONS

This patent application is related to the following concurrently-filed patent applications:

U.S. patent application Ser. No. 13/092,244, "SYSTEMS FOR SUGGESTING DOMAIN NAMES FROM A GEOGRAPHIC LOCATION DATA."

U.S. patent application Ser. No. 13/092,254, "GEOGRAPHIC DOMAIN NAME SUGGESTION TOOLS."

The subject matter of all patent applications is commonly owned and assigned to Go Daddy Operating Company, LLC. All prior applications are incorporated herein in their entirety by reference.

FIELD OF THE INVENTION

The present inventions generally relate to the field of domain name suggestion and registration and specifically to the field of suggesting and registering domain names based on a geographic location within online mapping software selected by the user or detected by a geo-location software on a mobile device.

SUMMARY OF THE INVENTION

The present inventions provide methods and systems for displaying, suggesting and registering available domain names on a client computer based on selected geographical locations from online mapping service software. An exemplary method may comprise several steps including the step of displaying any combination of online mapping service software and domain name suggestion/registration software on a client computer. The online mapping service software may be configured to zoom anywhere from a world view to an individual residence view, including any levels in between, to view any geographical locations including, but not limited to, continents, countries, regions, states, counties, areas, cities, or neighborhoods. The domain name suggestion/registration software may be an overlay on, or otherwise synchronized and/or coordinated with, the online mapping service software, thereby allowing the user to click on, or otherwise select the geographical area and locations displayed. The combination of software may then use the selected geographical area and/or locations to select a plurality of available domain names from data storage related to the geographical area and/or locations. These available domain names may be in a primary market and/or a domain name aftermarket and may be parsed for keywords related to the geographical areas and/or locations. These keywords, along with one or more Top Level Domains (TLD) may be displayed on the client computer, either as combined or separate user interface controls, possibly at coordinates on a map appropriate to the displayed geographical area. The selections of the user may be used to display to the user, in a preferred order, suggested available domain names, and receive the selection of domain names from the user. In some embodiments, another user interface control may also receive additional keywords from a user to "spin" the domain name suggestions, possibly predefined keywords specific to an industry. These domain name spinning suggestions from the user may be combined with the keywords parsed from the available domain names related to the geographical areas and/or locations and/or one or more a TLDs selected by the user to suggest and display available domain names, which may then be selected by the user.

The present inventions also provide methods and systems for an automated calculation and display of one or more suggested domain names using a geo-location software feature on a mobile client computer device, such as a PDA or smart phone. Any combination of online mapping service software and domain name suggestion/registration software may determine, receive, tag and display the location of the user and/or client computer based on the GPS, or other geo-location signal picked up from the mobile client computer device. A plurality of available domain names may be parsed and displayed according to the steps outlined above. Using the determined location and the keywords from parsed available domain names, a series of suggested domain names may appear through domain name registration software, which may be used in coordination or as an overlay to the online mapping software. Developers, contractors, builders, real estate agents, domain name speculators or any combination may use the software applications within these systems and methods in response to developing areas that show promising value. They may use these inventions to secure the domain names related to the areas or real estate to develop and create custom splash pages for homes or businesses based on the street address or business name respectively determined by the GPS signal and/or domain name suggestion/registration software. The suggested domain names may be as specific as the business or address found by the geo-location software, and/or as general as the state or other general area determined by the geo-location software.

The above features and advantages of the present inventions will be better understood from the following detailed description taken in conjunction with the accompanying drawings.

DETAILED DESCRIPTION

Figure 1:
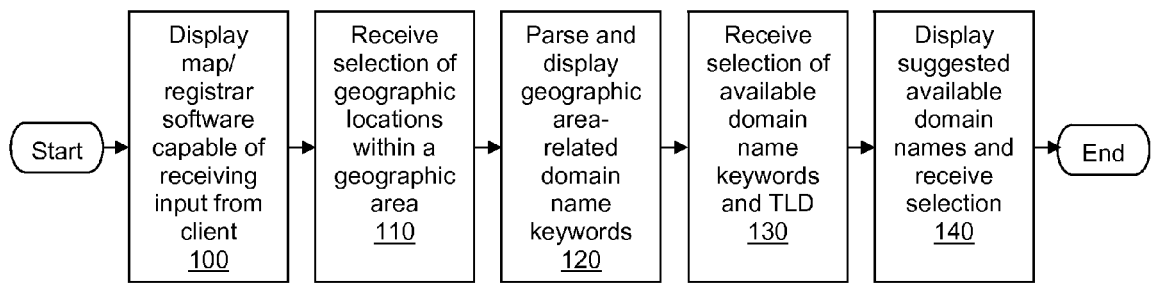
FIG. 1 is a flow diagram illustrating a possible embodiment of a method for suggesting one or more domain names based on a geographical location.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other web pages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a Top Level Domain (TLD) and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name.

For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

Software for an online mapping service can have both practical and entertainment applications. A user may view almost any location in the world using the satellite images or provided graphical maps within the software for popular online mapping services. This technology may be used to view many cities and famous landmarks, as well as navigating between one location and another. The online mapping software may be used to view every level of Earth from the planet itself down to a birds-eye view of the home in which the user lives, and every level of geographical location in between, either by finding a specific geographic location selected or entered by the user, or by zooming into the appropriate level of geographical locations selected by the user.

Although online mapping services may be accessed via a desktop computer, mobile devices (including, but not limited to laptop computers, smart phones, personal digital assistants, etc.) have become ubiquitous in recent years. The networking speeds for these mobile devices are increasing and there is more accessibility to mobile devices and wireless access points.

People tend to always have their laptop, phone, PDA, etc., where as they don't always have their desktop computer. This presents unique ways to generate revenue using mobile devices, where retailers and other businesses, such as domain name registrars, can capitalize on spontaneous purchases for some customers and provide more options for others.

Whether on a mobile device or a desktop computer, people are using online software to locate themselves, nearby businesses and residential addresses. By entering or zooming into a country, state, region, county, city, area, neighborhood, street address or any other geographical location, the user can get a bird's eye view of almost anywhere on earth.

GPS tagging is also becoming more popular because people are interested in geo-tagging and geo-tagging applications. Mobile application development has grown in recent years, and the download rate for these applications, including GPS related applications, have a large download rate. In addition to driving directions, people are interested in geo-tagging their current location, which can be accurate to within 15 feet of the user. These technologies also create unique ways to generate revenue using mobile devices which can capitalize on spontaneous purchases for some customers and provide more options for others.

Methods and Systems for Suggesting Map or GPS Based Domain Names

Several different methods may be used to provide and manage the disclosed inventions. In an example embodiment illustrated in FIG. 1, any combination of software modules used together with hardware on one or more server computers and/or client computers, described below, may display a map from an online mapping service. The software for this online mapping service may be used together with any combination of software used to suggest and/or register one or more domain names (Step 100). The combination of online mapping software and/or domain name suggestion/registration software may include any software shown and described within the example embodiments shown and described herein. Any combination of the online mapping service software and/or domain name suggestion/registration software may be configured to receive input from a user interface on the one or more client computers.

The input from any combination of online mapping service software and/or domain name suggestion/registration software may include a selection of geographical locations within a geographical area (Step 110). The geographical area displayed may include any view provided by the combination of software including views of the planet Earth down to a specific house the user wants to view. The user may input this selection using a zoom feature provided within the combination of software, or may input a specific geographical location that the user wants to view, using controls within the provided user interface. Geographical locations may include any level of geographical locations within a geographical area including, but not limited to, continents, countries, states, regions, counties, cities, areas, neighborhoods, or any other geographical divisions within the selected geographical area.

After receiving a selection of one or more geographical locations from the user of the client computer (Step 110), any combination of the online mapping software and/or domain name suggestion/registration software may analyze a plurality of available domain names in a primary market and/or domain name aftermarket. These available domain names may be selected from an appropriate database or other data storage and may be parsed for keywords related to the selected geographical locations (Step 120).

The keywords parsed from the available domain names and related to the selected geographical locations (Step 120) may be associated to map coordinates, possibly selected from a database associated with the online mapping service or other software. This database may include, as a non-limiting example, coordinates on maps to determine related cities on the online mapping software to sync with available domain names. Any combination of software may then associate the keywords related to the geographical locations with map coordinates on an online map. These coordinates may be used to display user interface inputs/controls in close proximity to the geographical locations displayed on the map and selected by the user. The user interface inputs/controls may contain the keywords associated with the available domain names and may be displayed on the online mapping services software at the coordinates associated with the appropriate geographical location.

In addition to user interface inputs containing the keywords, some embodiments may include one or more displayed user interface inputs containing one or more top level domains (TLD) such as .com, .net, .gov, .edu, or any other TLD now known or later developed. In other embodiments, the combination of suggested keywords and TLDs may be presented to the user in a single user interface input. In these embodiments, the combination of suggested keywords and TLDs may have been calculated by the online mapping software working in conjunction with the domain name suggestion/registration software using data from the appropriate data storage. Non-limiting examples of such information may include the geographical area, domain name and/or other keywords, such as industry keywords, to generate the keywords to search information in data storage for domain name suggestion information related to the primary market for domain names, or the domain name aftermarket, domain availability and/or accomplish any other methods disclosed herein.

The combination of the online mapping software and/or domain name suggestion/registration software may receive a selection of one or more available domain name keywords and TLDs from the user of the client computer (Step 130). The combination of selected available domain name keywords and TLDs may be analyzed and compared with the available domain names to determine and display one or more suggested domain names on the client computer according to the analysis by the one or more software modules (Step 140).

In some embodiments, these suggested available domain names may be displayed in order according to the best matches determined by the software combination. The user may then select the suggested domain name which best fits their needs (Step 140). In other embodiments, any variation on suggested available domain names now known or later developed may be employed, such as dashes, underlines, etc. In other embodiments, all possible combinations of the keywords related to available domain names and available TLDs may be selected and sent to the client computer, where one or more client side software modules may analyze the selections of the user and immediately display the best options for suggested available domain names.

Figure 2:
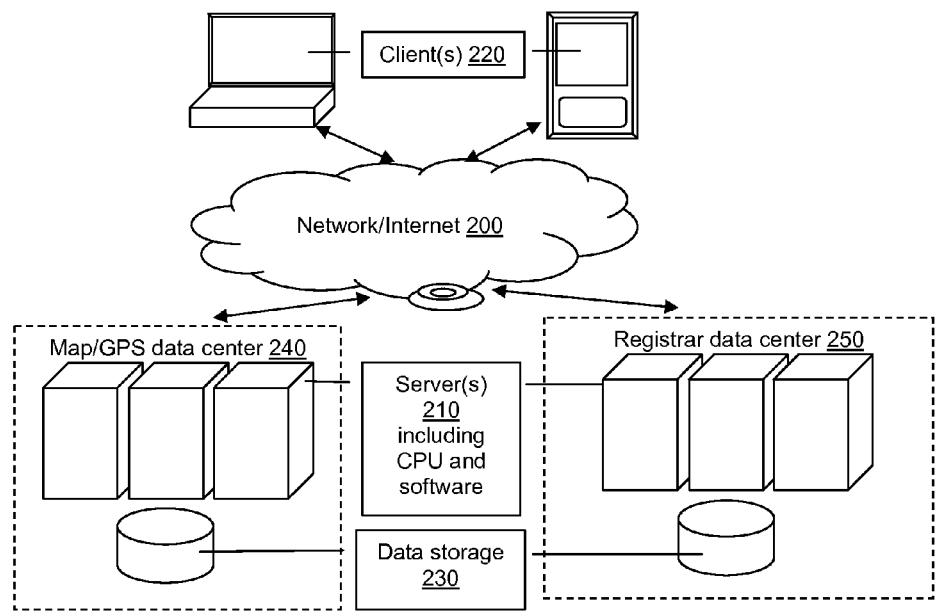
FIG. 2 illustrates a possible system for suggesting one or more domain names based on a geographical location.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules) in computer-readable media accessible to the CPU, such as a hard disk drive on a server 210 and/or client 220.

The example embodiments herein place no limitations on whom or what may comprise users. Thus, as non-limiting examples, users may comprise any individual, entity, business, corporation, partnership, organization, governmental entity, and/or educational institution that may have occasion to seek information for domain name suggestions based on geographical locations.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with software modules and the data storage 230 disclosed herein) may be communicatively coupled to the network 200 and to each other in such a way as to allow the exchange of information required to accomplish the method steps disclosed herein, including, but not limited to receiving the information from a user interface on one or more clients 220, and one or more servers 210 receiving the information.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, "smart" phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

The client computer(s) 220 which may be operated by one or more users and may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, a "smart" phone, an Internet access device, a rich client, thin client, or any other client functional with a client/server computing architecture. Client software may be used for authenticated remote access to one more hosting computers or servers, described below. These may be, but are not limited to being accessed by a remote desktop program and/or a web browser, as are known in the art.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in and after FIG. 4, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc.

The software modules used in the context of the current invention may be stored in the memory of—and run on—at least one server 210 and/or client 220. The software modules may comprise software and/or scripts containing instructions that, when executed by a microprocessor on a server 210 and/or client 220, cause the microprocessor to accomplish the purpose of the module or the methods disclosed herein.

The software modules may interact and/or exchange information via an Application Programming Interface or API. An API may be a software-to-software interface that specifies the protocol defining how independent computer programs interact or communicate with each other. The API may allow a requesting party's software to communicate and interact with the software application and/or its provider—perhaps over a network—through a series of function calls (requests for services). It may comprise an interface provided by the software application and/or its provider to support function calls made of the software application by other computer programs, perhaps those utilized by the requesting party to provide information for publishing or posting domain name and hosted website information.

The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

The software modules may also include mobile applications, possibly on a client computer and/or mobile device. These mobile applications, or "apps" may comprise computer software designed to help people perform an activity and designed to help the user to perform singular or multiple related specific tasks. It helps to solve problems in the real world by manipulating text, numbers, graphics, or a combination of these elements.

The server(s) utilized within the disclosed system 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof).

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The server(s) 210 or software modules within the server(s) 210 may use query languages such as MSSQL or MySQL to retrieve the content from data storage 230. Server-side scripting languages such as ASP, PHP, CGI/Perl, proprietary scripting software/modules/components etc. may be used to process the retrieved data. The retrieved data may be analyzed in order to determine information recognized by the scripting language, information to be matched to those found in data storage, availability of requested information, comparisons to information displayed and input/selected from the user interface or any other content retrieval within the method steps disclosed herein.

The server 210 and/or client 220 may be communicatively coupled to data storage 230 to retrieve any information requested. The data storage 230 may be any computer components, devices, and/or recording media that may retain digital data used for computing for some interval of time. The storage may be capable of retaining stored content for any data requested, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

As seen in FIG. 2, the server(s) 210 and data storage 230 may exist and/or be hosted in one or more data centers (240, 250). These data centers 240/250 may provide hosting services for websites, services or software relating to stored information, or any related hosted website including, but not limited to hosting one or more computers or servers in a data center 240/250 as well as providing the general infrastructure necessary to offer hosting services to Internet users including hardware, software, Internet web sites, hosting servers, and electronic communication means necessary to connect multiple computers and/or servers to the Internet or any other network 200. These data centers 240/250 or the related clients 220 may accept messages from text messages, SMS, web, mobile web, instant message, third party API projects or other third party applications.

As users access and/or input information, this information may be redirected and distributed between and among the data centers (240, 250) via commands from any combination of software modules hosted on the server(s) 210 and executed via processors on the server(s) 210. This information may then be accessed and manipulated by the combination of software modules or stored in the data storage 230 of any of a plurality of data centers, either separate from or integrated into the one or more servers, so that the information is available to be searched and accessed by the user and/or any other components of any or all data centers.

Any references to "software combination," "combination of software," "combination of software modules" etc. referred to herein may include any combination of software modules executed by a microprocessor on either the server 210 or client 220 computers. These software modules may also be used in combination with any other hardware or software structures disclosed herein. The servers 210 may be hosted in any data center (240, 250) operated by any hosting provider such as those disclosed herein and the servers 210 and clients 220 may be operated by any users disclosed herein.

Regarding the inventions disclosed herein, any combination of online mapping software in a data center operated by an online mapping service or other hosting provider may be used in combination with any combination of domain name suggestion and/or domain name registration software in a data center operated by a domain name registrar or other hosting provider. The software modules described herein may be run separately but may share common information or interfaces, possibly via an API. In other embodiments, the software modules may be two or more separate software module packages used in conjunction, possibly by overlaying one on top of the other, such as an overlay of the user interface controls for the domain name suggestion/registration software on the online mapping software. In still other embodiments, the online mapping software and domain name suggestion/registration software may be integrated software modules presented to the user in a unified and seamless way.

As a non-limiting example of such software modules, an online mapping software may be configured to receive input from the user which may trigger the online domain name suggestion and/or registration software described herein. An available domain name keyword parsing module may be used to parse available domain names for keywords related to geographical areas/locations selected by the user on the client computer and extract keywords from the available domain names to retrieve and compare information stored in data storage 230 for purposes of primary and/or aftermarket domain name availability. Several related software modules working together (disclosed herein), may likewise be used to suggest domain names based on the geographical locations, etc.

Figure 3:
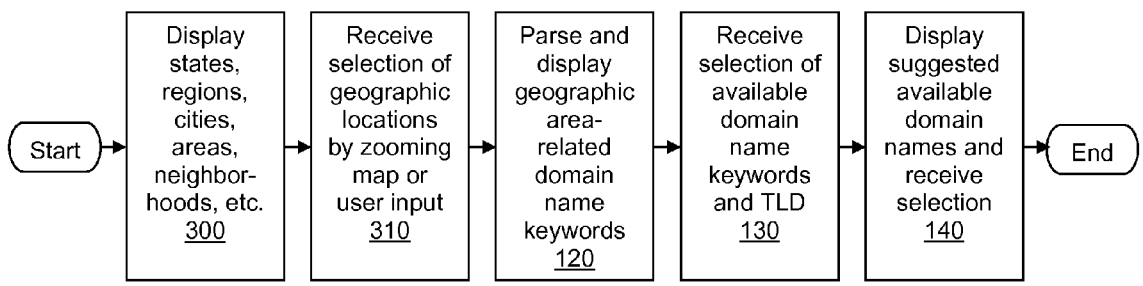
FIG. 3 is a flow diagram illustrating a possible embodiment of a method for suggesting one or more domain names based on a geographical location.

FIG. 3 shows that the embodiment illustrated in FIG. 1, as well as other disclosed embodiments, may include the steps of displaying, on the online mapping service software, various levels of maps including levels from world maps to specific addresses (Step 300). Any level between a world view on the online mapping software and a specific address may be displayed depending on the geographical area selected by the user (Step 110), including continents, countries, regions, states, counties, cities, areas, neighborhoods, or any other geographical location within a geographical area capable of being displayed on an online mapping software.

The selection of these geographical locations and geographical areas may be determined according to input received from the user of the client machine (Step 310). As a non-limiting example, the online mapping software may include a user input control which allows the user to zoom the displayed online map to various levels which, in turn, display various geographical areas containing multiple geographical locations, such as cities within a state in FIG. 4. In other embodiments, the user may input a specific geographical location, such as a specific city, that the user wants to view. The online mapping software may then determine the appropriate level to zoom the mapping software in order to display the selected geographical area and/or geographical location and other geographical locations at the same level.

In some non-limiting example embodiments, the online mapping software may be configured to receive input from the user in the form of a user clicking on one or more specific geographic locations to trigger the online domain name suggestion and/or registration software described herein. The domain name suggestion/registration component of this software combination in this example may detect the one or more selected geographical locations within the geographical areas (cities within the state of Colorado in FIG. 4).

Figure 4:
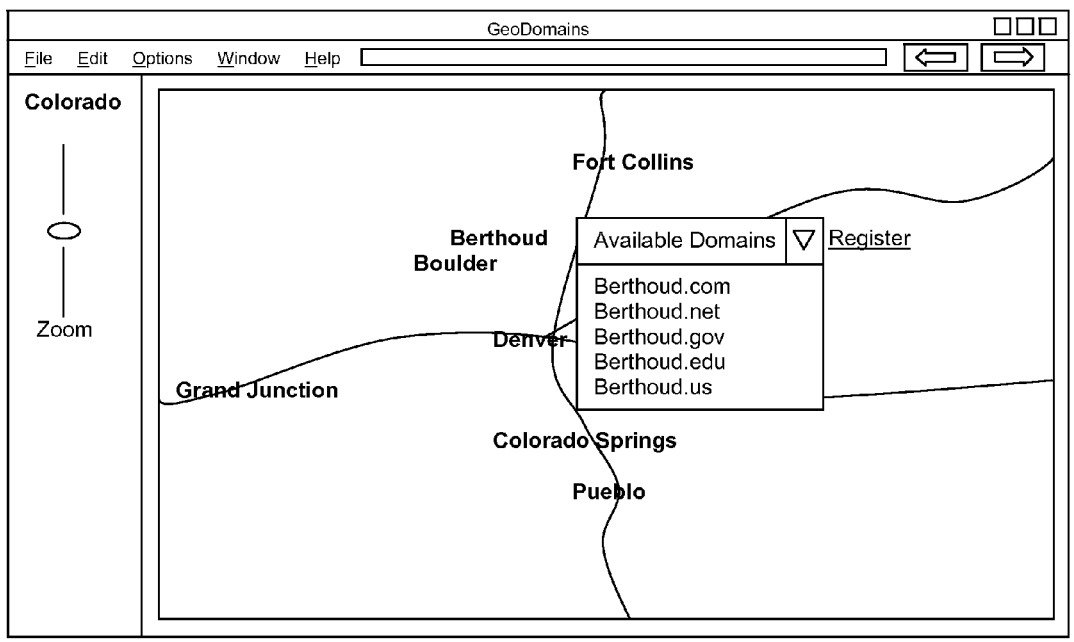
FIG. 4 illustrates a possible embodiment of an interface for suggesting one or more domain names based on a geographical location.

FIG. 4 shows an example interface using the disclosed structure that may be used for displaying the appropriate geographical location within a geographical area (Step 300). This may be accomplished by receiving a selection of the geographical locations within a geographical area. The geographical locations within the geographical area may be selected by zooming the online mapping software to the displayed level or receiving a selected geographical input via other user interface controls (Step 310).

In this non-limiting example, online mapping software may be displayed on a client computer, and any combination of software and/or user interface controls described herein may be configured to receive a command to zoom the online mapping software display to the major cities within the state of Colorado, the displayed geographical locations and the geographical area in this example, respectively. The mapping software may also display additional details, such as the major freeways in this example, but these details will not be discussed here in the interest of simplicity of the example.

In other embodiments (not shown in FIG. 4), the user may select one or more specific cities within Colorado (Denver, Boulder, Colorado Springs, Fort Collins, etc.) and input these selections into other user interface controls, such as a text box, check box, or drop down box, etc., in order to view the selected cities on the online mapping software. In still other embodiments, the disclosed software modules may make a determination of the best level of the online mapping software to display to the user, based on the cities selected by the user. These specific city selections may also be input as a means to request suggestions for available domain names related to that city. The disclosed software modules may then determine, using the keywords from parsed available domain names, what suggested available domain names to be displayed. In some embodiments, the user would need to know the name of the city to determine exact matches available for domain names for that city, such as the example embodiment seen in FIG. 4.

After receiving a selection of one or more major cities in the state of Colorado from the user, any combination of the disclosed software may analyze a group of available domain names in a primary market or domain name aftermarket. These available domain names may be selected from a database or any other data storage 230 related to the domain name markets or aftermarkets and may be parsed for keywords related to the selected cities in Colorado or any other geographical divisions within the selected geographical area (Step 120, Step 310). This parsing for keywords may be accomplished by software modules on the server computer(s). In the interest of simplicity in this non-limiting example, it will be assumed that the domain names for major cities, such as Denver.com, Boulder.com, Colorado Springs.com, etc. are not available domain names, so a lesser known city, Berthoud, will be used in the following examples.

In this non-limiting example, the software modules for the domain name suggestion/registration software may be run on all exact matches for city names in the selected area. Alternatively, in this example, the city of Berthoud may have been selected, or the domain name suggestion/registration software may have determined that a search for the city of Boulder does not yield any suggested domain names, as they are not available, but that the nearby city of Berthoud has several domain names available, including domain names with top level domains .com, .net, .gov, .edu and .us. In other embodiments, described herein, variations on the names of the cities selected, or surrounding cities in the greater city area, may also be used to suggest/register domain names. The domain names suggested may be derived by parsing the domain name into keywords, as well as all subsequent steps described herein for parsing domain names and comparing the keywords to the names of the geographical divisions to return a result set (Steps 110-120).

The keywords related to the cities selected and parsed from the available domain names may be associated to map coordinates, possibly pulled from a database or any other data storage 230 associated with the online mapping service software. These coordinates may be used by the domain name suggestion/registration software to display user interface inputs containing the keywords associated with the available domain names on the user interface of the client machine at the coordinates determined by the online mapping service software, next to Berthoud, Colo. in the example embodiment seen in FIG. 4.

These suggested available domain names may be displayed according to the geographical locations selected by the user where the geographical division is appropriate to the domain names that are available and displayed using any combination of software and hardware on the client computer (Step 130). In the example embodiments shown in FIG. 4, a combination of suggested keywords and TLDs may be presented to the user on the map next to the city of Berthoud in a single user interface input. In other embodiments, such as those seen in FIGS. 6, 8 and 12, the keywords and TLDs presented to the user may be displayed in separate user interface controls. The maps within the online mapping software may display the geographical locations appropriate to the available domain names.

For example, the dropdown box may be integrated into the map software from one or more software modules in the Map/GPS data center 240 using one or more software modules on the server in the registrar data center 250. These software modules, working together, may display an interface element such as a dropdown box next to a city with available domain names, such as Berthoud in the example embodiment in FIG. 4.

The example embodiment shown in FIG. 4 has been simplified to only display available domain names with exact matches to the city of Berthoud. In this simplified and non-limiting example embodiment, the city of Berthoud has the actual name of the city available with several top level domain names. In other embodiments related to domain name spinning, described herein, combinations of the city name with related keywords parsed from available domain names may be displayed as well including, for example, "BerthoudTourism.com," "BerthodCityCouncil.com," "BerthoudSchoolDistrict.edu," etc.

This embodiment also shows a dropdown box for only one city. However, other embodiments may include user interface controls for all cities on the map, or any city which may be configured to be selected in the geographical area by the user. These user interface controls may include links, check boxes, buttons, etc. for the user to click on for each of the cities displayed on the map. In other embodiments, each of the cities displayed at that level of geographical area on the map may have its own dropdown box containing the available domain names for that city. These cities may be compared to the keywords parsed from available domain names related to the cities selected using any combination of the steps described related to FIGS. 1 and 3 herein.

Once the user has selected the keywords, TLDs and/or available domains related to the keyword, geographic area and available domains, the user may select a user interface control to register the domain. In the embodiment shown in FIG. 4, the user may select a link to register the domain. The domain name suggestion/registration software may include a registration web page on a registrar website, auto filled by information passed through HTML fields, query string, etc. from an interface such as that shown in FIG. 4. After selecting the user interface control to register the domain name, the user may be taken to a registrar domain name registration web page where the selected domain name may be registered. In other embodiments, other interface elements, such as a button may be used to take the registrant to the registration webpage.

The information taken from the form elements on the interface shown in FIGS. 4, 6, 8 and 12 may be used to pass the selected information from the displayed page to the registrar web page. This may be accomplished by passing the information by hidden form fields, query strings, etc. used to open the domain name registration web page, which may then be populated with the information selected by the user, thereby streamlining the process of registering the desired domain name.

Figure 5:
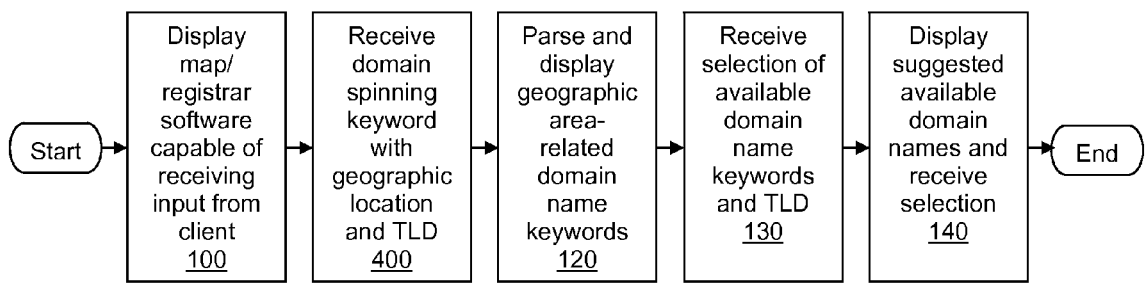
FIG. 5 is a flow diagram illustrating a possible embodiment of a method for suggesting one or more domain names based on a geographical location.

FIG. 5 shows that the embodiments illustrated in FIGS. 1-4, as well as other disclosed embodiments, may include the step of receiving one or more keywords from the user. These keywords, when combined with the geographic location and TLD, may be used to "spin" the domain name suggestion using the keywords provided by the user (Step 400). These spinning keywords may be related to an industry. Any combination of software modules described herein may receive and analyze the information submitted, possibly supplemented with additional information from data storage within the one or more data centers. Using this submitted information, one or more software modules on the one or more server computers may create a collection of possible alternative suggested domain names. This may be accomplished by comparing the user's selection of geographical location, TLD and optional spinning keywords with possible matches contained in a database for available domain names.

Figure 6:
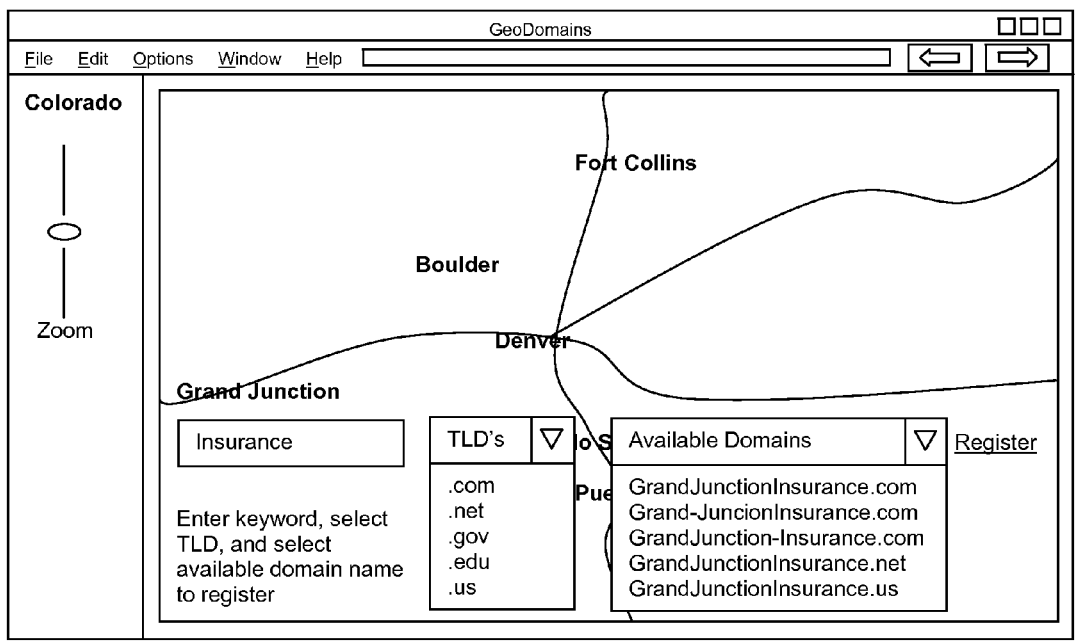
FIG. 6 illustrates a possible embodiment of an interface for suggesting one or more domain names based on a geographical location.

FIG. 6 shows an example interface using the disclosed structure that may be used to receive one or more keywords from the user, possibly related to an industry, that when combined with the geographic location and TLD, are used to "spin" the domain name suggestion (Step 400) and suggest available domain names using the keywords provided by the user. In this non-limiting example the user may zoom in from a world level of the online mapping software to the United States country level and on to the state level, displaying the state of Colorado. In other embodiments, the user may have specifically requested either Colorado or Grand Junction, Colo. to achieve the display as shown and described herein.

In the non-limiting example embodiment shown in FIG. 6, the user may have selected a city meant to be the focus of the suggested domain names, in this case Grand Junction. In other embodiments, alternative user interface controls may be used to select the city that is the focus of the domain name suggestion. For example, the user may have entered into a text box, check box, drop down box, etc., a selection of Grand Junction Colo. In other embodiments, suggestions may be made for all smaller towns surrounding Grand Junction.

In the interest of simplicity, only the user interface controls related to Grand Junction are shown in the non-limiting example embodiment shown in FIG. 6. Input from the one or more software modules and one or more user interface controls, possibly combining software modules from the online mapping software and the domain name suggestion/registration software, may cause an interface for domain name spinning to appear to allow the user to enter one or more keywords, in this example, "Insurance" associated with the insurance industry, to be combined with the city selected, in this case Grand Junction. Instructions may also be displayed to the user when the geographical location is selected by the user, as seen in FIG. 6, such as clicking on the city selected. In other embodiments, a user may click on multiple cities, which may, in turn, cause multiple interfaces to be displayed for each city within that state, or any other geographical location within any geographical area, etc.

The non-limiting example embodiment shown in FIG. 6 shows that after entering the keywords the user wants added to create variations for domain name suggestions for that city, the user may be provided one or more user interface elements to select a TLD that the user wants appended to the city name and selected keyword. In other embodiments, only the keyword, and not the TLD, may be required for the software modules to determine available domain names.

The combination of software modules may compare and analyze the selected keyword and the selected city, analogous to the steps of parsing and displaying geographical area domain name related keywords (Step 120) described herein relating to FIGS. 1-5. These software modules may determine available domain names and their related keywords. In some embodiments, the software modules may automatically determine available domain names and TLDs available using the geographical locations chosen and the keywords input by the user. In other embodiments, the software may select and display available TLDs as a separate control, as seen in FIG. 6. The selections of suggested available domain names may be displayed to the user and the selection may be received by the one or more software modules (Step 140), as described herein, but may also include variations on the keywords entered by the user, displaying the closest combination and selection of TLD's first. In other embodiments, a list may be created which automatically combines the closest combination of keyword with city name with the most popular TLD available for the combinations.

As seen in FIG. 6, if desired combinations of the keyword with the city and selected TLD are not available, other domain suggestion techniques as known in the art may be used to offer other possibilities, such as including hyphens in the combination, as shown. Other variations may include underlines, combining the city and keyword with other words such as "online" etc. This may be applied to all domain suggestion algorithms described herein. In other embodiments, all possible combinations of the keywords related to available domain names and available TLDs may be selected and sent to the client computer, where one or more client side software modules may analyze the selections of the user and immediately display the best options for suggested available domain names.

Figure 7:
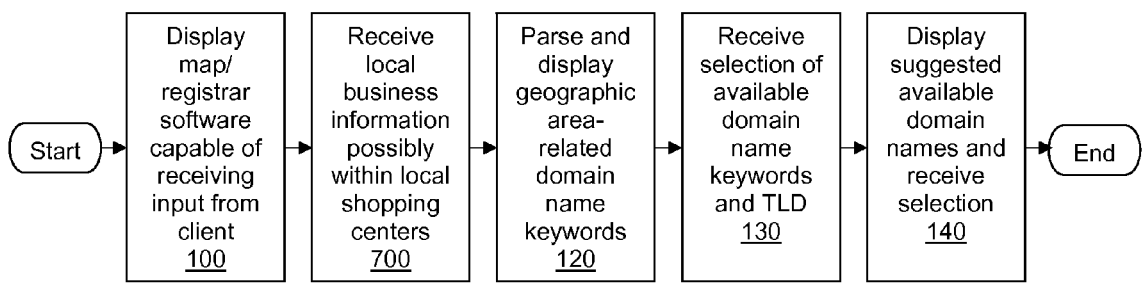
FIG. 7 is a flow diagram illustrating a possible embodiment of a method for suggesting one or more domain names based on a geographical location.

FIG. 7 shows that the embodiments illustrated in FIGS. 1-6, as well as other disclosed embodiments, may include the step of receiving information about local businesses from the online mapping software (Step 700), as selected by the user zooming the map or otherwise selecting the local businesses. These businesses may be located in shopping centers determined to be in popular or up and coming areas.

Figure 8:
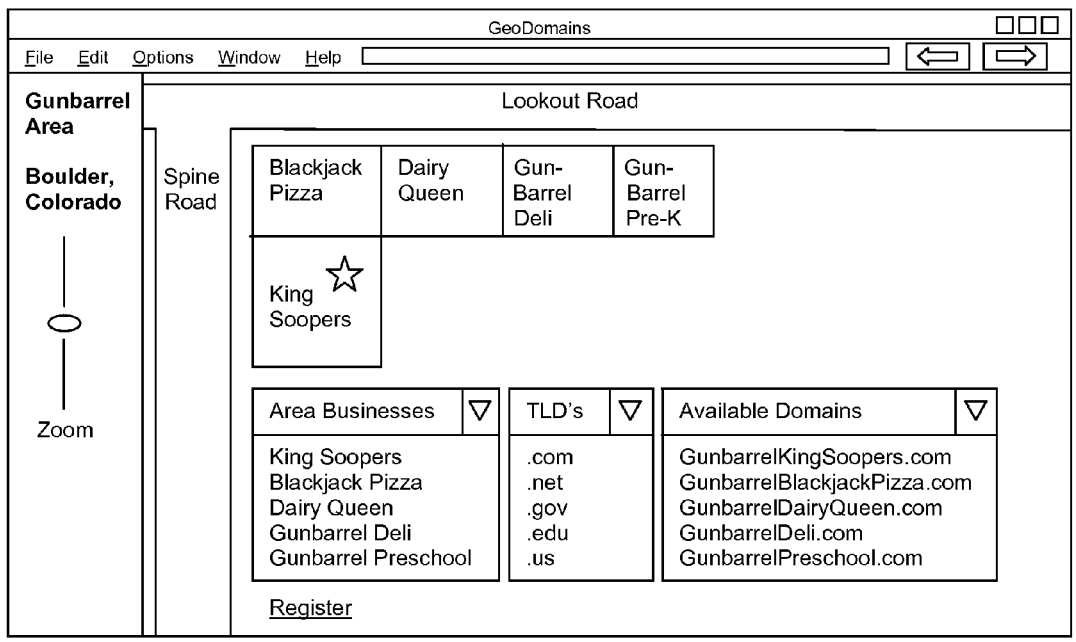
FIG. 8 illustrates a possible embodiment of an interface for suggesting one or more domain names based on a geographical location.

FIG. 8 shows an example interface using the disclosed structure that may be used to receive local business information, possibly within local shopping centers (Step 700) based on the area selected to be viewed on the map (Step 100). In this non-limiting example the user may have zoomed in from a world level of the mapping software to the United States country level and on to the state level, displaying the state of Colorado, to the city level in Boulder Colo., to a specific area within Boulder known as the Gunbarrel area. In other embodiments, the user may have specifically requested the Gunbarrel Area of Boulder Colo. using any combination of user interface controls. The information about the local businesses may include information about the name, address, manager, etc. of the local businesses. In the interest of simplicity, only the business names are shown in FIG. 8.

In this example embodiment, the user may have zoomed in to look at a shopping center at the crossroads of Spine Road and Lookout road, where information from a database in data storage from either data center 240/250 may contain information about this shopping center and may list any relevant information about the businesses within the shopping center. Additional information, such as demand for the retail space, sales records for the businesses, MLS listings etc. may also be determined and stored to determine the desirability of the real estate space and the domain names related to this real estate.

In FIG. 8, five businesses occupy the shopping center: King Soopers, Blackjack Pizza, Dairy Queen, Gunbarrel Deli and Gunbarrel Preschool. These businesses and the surrounding area may be displayed using the online mapping software or any combination of online mapping software and domain name suggestion/registration software described herein (Step 100). These businesses may be listed in a dropdown box, as shown in the non-limiting example in FIG. 8, or within any other user interface control.

The user may then select one of several TLD's shown from a second dropdown list. As with other embodiments disclosed herein, the software modules may be configured to display the area businesses and TLDs automatically, or may display the businesses and TLDs when the user clicks on either the shopping center, to view all businesses in the shopping center, or on each business individually, if available and desired.

Any steps previously described analogous to and/or described in FIGS. 1-7 may be employed to suggest available domain names related to those businesses, the shopping centers and the areas in which they are located. These steps may include embodiments where the TLD is separately displayed, or may make suggestions according to available combinations of "spinning" keywords, the businesses/shopping centers and TLDs.

Several options may be available once the user selects the area, business and TLD. In some embodiments, the business and TLD may be combined together by the software modules, where the business already includes the name of the area of the city, such as "Gunbarrel Deli" and "Gunbarrel Preschool." In other embodiments, the software may be configured to automatically combine the name of the area with the selected business and the TLD, as would be seen in embodiments including "GunbarrelKingSoopers.com," "GunbarrelBlackjackPizza.com," and "GunbarrelDairyQueen.com." In still other embodiments, the user may wish to select the area to combine with the business and TLD. In still other embodiments, the software may determine automatically, based on the area selected by the user, what area name to combine with the business and TLD, or may detect that businesses with the area name already included do not need to have the area appended to the name of the business, such as Gunbarrel Deli and Gunbarrel Preschool.

Figure 9:
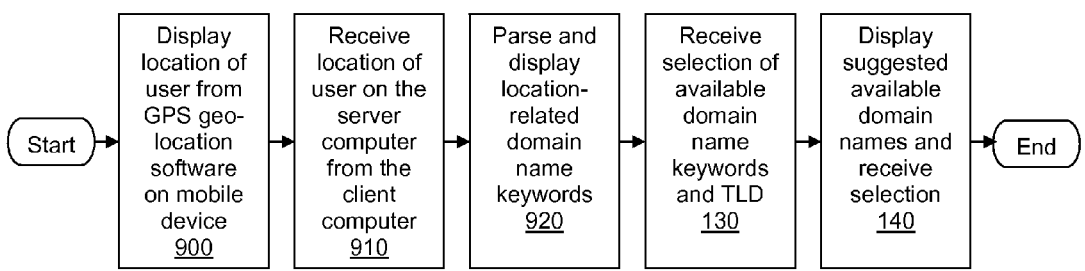
FIG. 9 is a flow diagram illustrating a possible embodiment of a method for suggesting one or more domain names based on a geographical location.

FIG. 9 shows that the embodiments illustrated in FIGS. 1-8, as well as other disclosed embodiments, may include the steps of displaying the location of the user on a client computer or mobile device using a geo-location feature on the client computer or mobile device (Step 900). The user's location, possibly tagged based on a GPS signal picked up from the client computer, may then be used to suggest domain names relevant to the geographical location. Any combination of software modules on one or more server computers for a GPS service, online mapping service and/or domain registrar may receive the user's location from the client computer (Step 910). Using this location, the one or more software modules may parse and display domain name keywords from available domain names which are relevant to the users location (Step 920), using method steps analogous to any of the method steps described in FIGS. 1-8. As seen in FIG. 2, this geo-location information may be stored in data storage 230 such as a database containing a static or dynamic list of geo-location information and/or available domain names.

Once the geo-location feature information has been used to parse available domain names for keywords related to the geographical location (Step 920), a series of suggested domain names related to the domain name keywords, may be displayed on a client computer, possibly a mobile device, thereby suggesting domain names based on the keywords parsed and/or extrapolated from the region, city, place, current developments, residential location, etc. determined by the geo-location feature using the cell phone or other mobile device and the GPS integrated into the mobile device. In embodiments analogous to FIG. 4, the domain name may be an exact match and may be combined with a TLD. In other embodiments, the domain name keywords may be combined with variations of the keywords and may be selected separately from the TLD, as seen in FIGS. 6 and 8.

The geo-location software may be any software/hardware combination that provides reliable location and time information in various weather and at various times on or near the Earth, using a receiver which calculates the user's position by precisely timing the signals sent. As a non-limiting example, a GPS system may be used as the geo-location software. The GPS may use a global navigation satellite system (GNSS) to provide location and time information where there is an unobstructed line of site for 4 GPS satellites. The GPS receiver on the client computer/mobile device may calculate its position by timing the signals sent by the satellites. Each satellite may continually transmit a message that includes the time the message was transmitted. The receiver may then use the message it receives to determine the transit time of each message and compute the distance to each satellite. These distances along with the satellites' locations may be used with the possible aid of trilateration, depending on which algorithm is used, to compute the position of the receiver. This position may then be displayed, perhaps with a moving map display or latitude and longitude; elevation information may be included. Many GPS units show derived information such as direction and speed, calculated from position changes.

Figure 10:
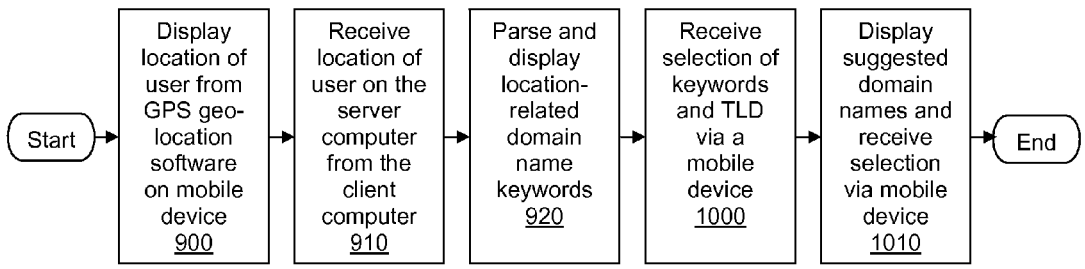
FIG. 10 is a flow diagram illustrating a possible embodiment of a method for suggesting one or more domain names based on a geographical location.

FIG. 10 shows that the embodiment illustrated in FIGS. 1-9, as well as other disclosed embodiments, may include the steps of receiving a selection of keywords, TLDs and possibly spinning keywords via a mobile device (Step 1000) and after receiving this selection, may display on the mobile device suggested domain names for the GPS location on an application found on the mobile device (Step 1010). These steps may be accomplished using any of or analogous steps disclosed herein for receiving a selection of available domain names, keywords and TLDs (Step 130) and displaying suggested available domain names and receiving the selection of these domain names (Step 140) disclosed regarding FIGS. 1-9 herein.

FIG. 8 shows an example interface using the disclosed structure that may be used to display the location of a user based on a geo-location software on a mobile device (Step 900) and any combination of software on the disclosed server computers may then receive this location (Step 910). Any steps described herein analogous to and/or described in relation to FIGS. 1-10 may be employed to parse the location for keywords and display domain names related to the user's location on the client computer (Step 920), receive a selection of spinning keywords, available domain name keywords and TLDs (Step 130, Step 1000) and display and receive a selection of the displayed suggested available domain names (Step 140, Step 1010).

The suggested domain names may be relevant to the area being viewed on the map, including relevant shopping centers or residential areas in up and coming areas. In this non-limiting example the user may be located using the geo-domain feature on a mobile device from a world level of the geo-location feature to the United States country level and on to the state level, displaying the state of Colorado, to the city level in Boulder Colo., to a specific area within Boulder known as the Gunbarrel area.

As a non-limiting example, the star in FIG. 8 may show the location for a manager for a local King Soopers supermarket based on the signal received from the geo-location feature, such as a GPS, possibly located on the manager's client computer, possibly a smart phone. In this example, the manager may want to create a website for the local store, showing specials, what products are available, directions to the store, etc. To accomplish this, the manager may start the software for the present invention, including opening a synchronized software application that uses information from both the registrar data center and/or information from either or both of the mapping software data center or information taken from GPS software and possibly stored in such a data center.

As seen in previously shown and described embodiments, the information for available domain names may have been parsed for keywords related to possible information and the relevant geographical divisions may have been associated to map coordinates and marked on the map (Step 910, Step 110), possibly from the map showing the GPS information determined by the geo-location feature on the smart phone (Step 900).

The location for the user may be shown on the displayable map that shows the location of the user, possibly as determined by the GPS software. FIG. 8 shows the location of the manager/user by showing a star in the King Soopers store. The software using both the GPS/mapping software and the registrar software may then display suggested domain names based on the location of the user/manager (Steps 910-920). This software may be used together possibly as integrated separate software, overlays, or may be integrated into a single software.

In some embodiments, there may be additional software modules specific to the type of organization or franchise trying to access the software to register certain domain names. In these embodiments, King Soopers would only want managers or others within the organization to be able to access the software to register the domain names. To accomplish this, the software may require the managers to have a unique password, or corporate password that would allow them to access the software, thereby avoiding situations where others could register domain names in order to sell them to the organizations/franchises.

In other embodiments, contractors/developers/domain speculators may recognize trends, using the data and possible software modules described herein to determine such trends in up and coming developing areas and may want to register as many domain names relevant to the area as possible to later sell to vendors/franchises as they begin to move into these developing areas. The software and data to determine the up and coming areas for sections of towns may include possibly a database of recent news articles about the relevant areas, such as real estate, development, contractors, retailers magazines, public MLS sales records, etc.

This non-limiting example also demonstrates that any of the embodiments herein may be used not only in the primary domain name market, but also in the domain name aftermarket. By buying the geographically related domain names early, the domain speculators may be able to take advantage of auctioning off the domains after they are originally bought and sell to those in the up and coming hot areas of towns.

Figure 11:
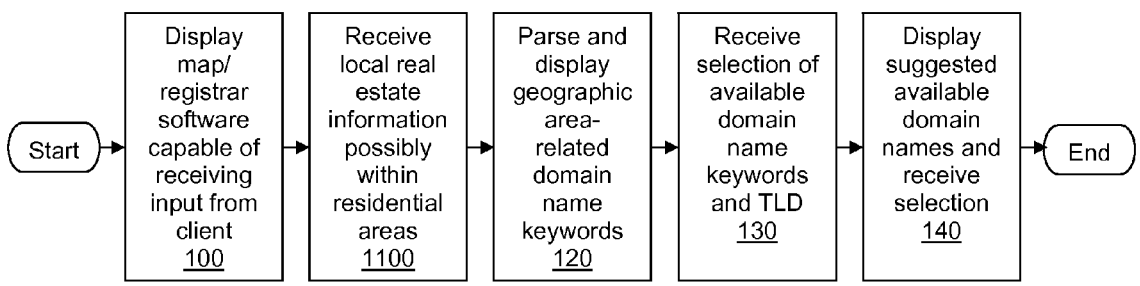
FIG. 11 is a flow diagram illustrating a possible embodiment of a method for suggesting one or more domain names based on a geographical location.
Figure 12:
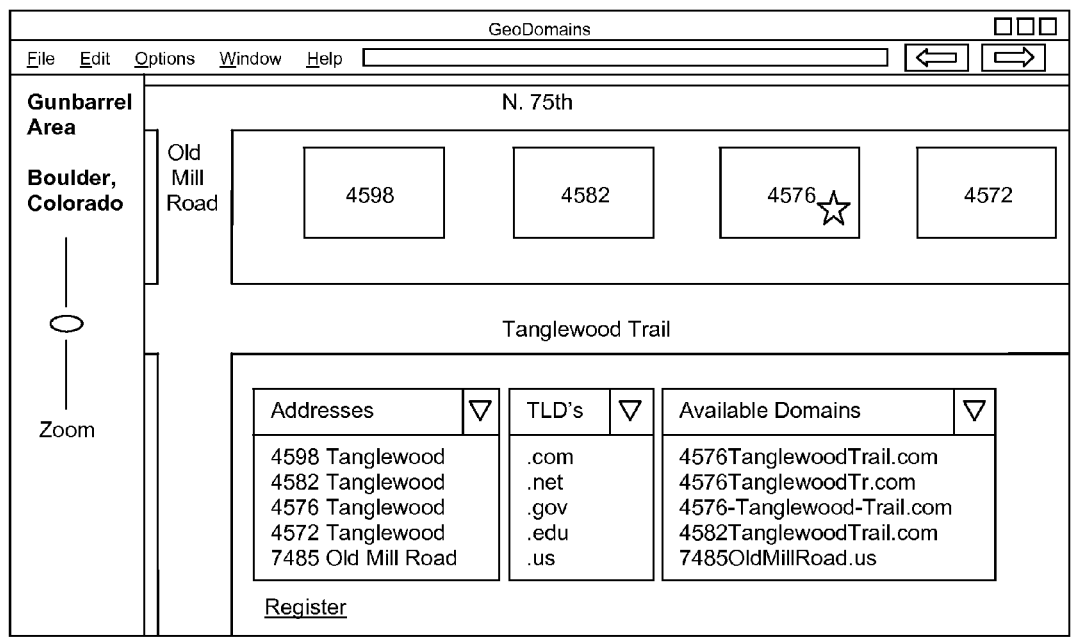
FIG. 12 illustrates a possible embodiment of an interface for suggesting one or more domain names based on a geographical location.

As seen in FIGS. 11 and 12, the method steps disclosed regarding FIGS. 8-10 may also be applied to the example embodiments shown in FIGS. 11 and 12. FIG. 11 shows that the embodiments illustrated in FIGS. 1-10, as well as other disclosed embodiments, may include the step of receiving real estate information for one or more houses, possibly within a residential area (Step 1100). Available domain names related to those houses, the residential areas and the areas they are located in may be suggested, using method steps analogous to or described in any of the method steps described in FIGS. 1-10.

FIG. 12 shows an example interface using the disclosed structure that may be used to receive information about real estate such as houses within a selected area showed on online mapping software (Step 1100). The steps previously described in or analogous to any of the method steps described regarding FIGS. 1-10 may be employed to suggest available domain names related to those houses, the residential areas and the areas in which they are located. These steps may include embodiments where the TLD is separately displayed, or may make suggestions according to available combinations of spinning keywords and TLDs.

Data storage 230 in these embodiments may contain information about available domain names related to the street address and the area being viewed on the map in response to user input or the geo-tagging of the remote client computer. In this non-limiting example the user may have zoomed in from a world level of the mapping software to the United States country level and on to the state level, displaying the state of Colorado, to the city level in Boulder Colo., to a specific area within Boulder known as the Gunbarrel area. Specific streets within the Gunbarrel area are shown in this example embodiment, and using the information determined from method steps described in or analogous to those in FIGS. 1-8, the addresses on these streets with available domain names may be suggested to the user.

The user in the example embodiment in FIG. 12 has zoomed in to look at, or the geo-location software has tagged, a neighborhood at the crossroads of N. 75th, Old Mill Road and Tanglewood Trail, where a database in either the mapping or the registrar data centers or integrated data storage may contain information about this neighborhood and may list the addresses with available corresponding domain names within the neighborhood. Additional information, such as demand for the houses within the neighborhood, real estate listings, high prices being sold in the area, etc. may also be determined and stored to determine the desirability of the houses within the neighborhood and the related domain names.

Five houses are available for domain name registration within the residential area displayed in FIG. 12: 4598 Tanglewood Trail, 4582 Tanglewood Trail, 4576 Tanglewood Trail, 4572 Tanglewood Trail and 7485 Old Mill Road. These addresses may be listed in a dropdown box, or any other user interface control, as shown in the non-limiting example in FIG. 12.

The user may then select one of several TLD's shown from a second dropdown list. As before, the software modules may be configured to display the available addresses and TLDs automatically, or may display the addresses and TLDs when the user clicks on either the individual addresses, or addresses for surrounding residences, if available and desired. In embodiments with similar features to FIG. 4, the user may specifically select (possibly via checkbox, etc.) only one address to see selected domain names related to the address.

In other embodiments, addresses not shown, but found within the neighborhood that are desirable and have available corresponding domain names may also be listed. For example, although houses on Old Mill Road are not seen on the map displayed, the domain name suggestion drop-down boxes show available domain names corresponding to the addresses on Old Mill Road. To accomplish this, the software may be configured to receive the addresses within a certain radius of the selected house or the location of the user.

Several options are available once the user selects the area, address and TLD. In one embodiment, address and TLD may be combined together, where the address already includes just the name of the address. In other embodiments, the software may be configured to automatically combine the name of the address with the city and/or area. In some embodiments, the user may wish to select the area to combine with the business/address and TLD. In other embodiments, the user may select hyphenated versions, or underlines, etc.

In FIGS. 9-10 and 12, the embodiments illustrated in FIGS. 1, 3, 5, 7 and 9-11, as well as other disclosed embodiments, may include the steps of suggesting domain names based on the keywords parsed and/or extrapolated from the neighborhood or addresses determined by the geo-location feature using the cell phone and the GPS integrated into the mobile device, as described regarding FIGS. 9-10. The software may be configured to receive from the real estate agent/developer a range of houses within a fixed area defined by the user to suggest all available homes/domain names within that fixed area. (1 mile/10 miles/within the neighborhood/within the city, etc.)

As a non-limiting example, the star in FIG. 12 may show the location for a real estate agent with a listing for a 4576 Tanglewood Trail based on the signal from the geo-location feature, possibly located on the real estate agent's smart phone. In this example, the agent may want to create a website for the listing including custom splash pages for the home, directions to the home, etc. To accomplish this, the agent may start the present invention, including opening a synchronized software application that uses information from both the registrar data center and/or information from either or both of the mapping software data center or information taken from GPS software and possibly stored in such a data center.

As seen in previously shown and described embodiments, the information for available domain names may have been parsed for keywords related to possible information and the relevant geographical divisions may have been associated to map coordinates and marked on the map, possibly from the map showing the GPS information determined by the geo-location feature on the smart phone.

The location for the user may be shown on the displayable map that shows the location of the user as determined by the GPS software. FIG. 12 shows the location of the agent/user by showing a star in the address of 4576 Tanglewood Trail. The software using both the GPS/online mapping software and the domain name suggestion/registration software may then display suggested domain names based on the location of the agent/user. This software may be used together as possibly overlays, or may be integrated into a single software.

In some embodiments, there may be additional software specific to the type of real estate organization trying to access the software to register certain domain names. In these embodiments, certain real estate groups would only want agents or others within the organization to be able to access the software to register the domain names. To accomplish this, the software may require the agents to have a unique password, or corporate password that would allow them to access the software, thereby avoiding situations where others could register listed addresses and sell them to the organizations/franchises. This would also apply to contractors or builders, who could potentially blend the uses that both domain name speculators and realtors have for geo-specific domain names.

In other embodiments, contractors/developers/domain speculators may recognize trends in up and coming developing areas and may want to get as many domain names relevant to the area as possible to sell to real estate agents or developers as they begin to sell residences in these developing areas. The software to determine the up and coming areas for hot sections of towns may include possibly a database of recent news articles about the area in relevant areas, such as real estate, development, contractors, retailers magazines, etc.

The additional steps included in the embodiments illustrated in FIGS. 1-12 are not limited to their respective illustrated embodiments, and may be combined in several different orders and modified within multiple other disclosed embodiments. Likewise, the method steps disclosed herein may be accomplished by a software module executed on a server and/or client configured to accomplish that method step.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
A) receiving, by a server computer communicatively coupled to a network, a geographic location data identifying a plurality of place names, wherein
   the geographic location data comprises a geographic location within a geographic area,
   the geographic area comprises a planet, a continent, a country, a state, a region, a county, a city, an area, or a neighborhood,
   the geographic location comprises a continent, a country, a state, a region, a county, a city, an area, a neighborhood, a residence or a business within the geographic area and identified as local to the geographic location data,
   the geographic location data comprises a geographic location selection comprising a text string received from an online map software, or a geographic location received from, and displayed and selected within, a geographic area of a map rendered by the online map software,
   and the map software is configured to render a map of the geographic location within the geographic area, and zoom to a different geographic area comprising at least one geographic location;
B) parsing, by the server computer, each place name in the plurality of place names into at least one keyword;
C) identifying, by the server computer, in a database communicatively coupled to the network, a plurality of domain names, each of the plurality of domain names being available for registration;
D) determining, by the server computer, whether each domain name in the plurality of domain names comprises a keyword parsed from the plurality of place names; and
E) for each domain name in the plurality of domain names that comprises the keyword parsed from the plurality of place names:
   i) identifying, by the server computer, coordinates at which a place associated with the place name from which the keyword was parsed is displayed on a map graphic;
   ii) generating, by the server computer, a user interface component configured to receive input from a user;
   iii) rendering, by the server computer:
      a) the domain name within the user interface component; and
      b) the user interface component on the map graphic at the coordinates; and
   iv) transmitting, by the server computer, to a client computer communicatively coupled to the network, the map graphic comprising the user interface component at the coordinates.

2. The method of claim 1, wherein the geographic location data comprises a geographic location identified within a plurality of data received from a geo location software.

3. The method of claim 1, wherein the at least one keyword comprises an address or a name of a business identified as local to the geographic location data.

4. The method of claim 1, wherein the at least one keyword comprises a residential address.

5. The method of claim 1, wherein the geographic location data further comprises at least one additional keyword.

6. The method of claim 5, further comprising the steps of:
   determining, by the server computer, whether each domain name in the plurality of domain names comprises a keyword parsed from the plurality of place names and the at least one additional keyword.

7. The method of claim 5, wherein the at least one additional keyword comprises a user-chosen, industry-specific keyword.

8. The method of claim 5, wherein the at least one additional keyword comprises a name, a manger or an address of a business identified as local to geographic location data.

9. The method of claim 5, wherein the at least one additional keyword comprises a residential address identified as local to the geographic location data.

10. The method of claim 1, wherein step E) further comprises the steps of:
   v) receiving, by the server computer, a selected available domain name from the user interface component;
   vi) rendering, by the server computer, a domain name registration web page configured to register the selected available domain name with a registrar; and
   vii) transmitting, by the server computer, the domain name registration page to the client computer.

11. The method of claim 10, wherein:
   i) the selected available domain name includes at least one registrant data about a user that selected the selected available domain name; and
   ii) a rendering of the domain name registration web page comprises:
      a) the selected available domain name; and
      b) the at least one registrant data.

12. The method of claim 11, further comprising the steps of:
   viii) receiving, by the server computer, from the domain name registration web page, a request to register the selected available domain name; and
   ix) registering, by the server computer, the domain name.

* * * * *